United States Patent
Hou et al.

(10) Patent No.: US 9,278,509 B2
(45) Date of Patent: Mar. 8, 2016

(54) PREPREG TAPE SLITTING METHOD AND APPARATUS

(71) Applicant: Web Industries, Inc., Marlborough, MA (US)

(72) Inventors: Grand Hou, Norcross, GA (US); Christopher R. Horn, Johns Creek, GA (US); Manish Patel, Bogart, GA (US); Jianghong Liang, Decatur, GA (US)

(73) Assignee: Web Industries, Inc., Marlborough, MA (US)

( * ) Notice: Subject to any disclaimer, the term of this patent is extended or adjusted under 35 U.S.C. 154(b) by 0 days.

(21) Appl. No.: 14/569,657

(22) Filed: Dec. 13, 2014

(65) Prior Publication Data

US 2015/0099111 A1 Apr. 9, 2015

Related U.S. Application Data

(63) Continuation of application No. 13/627,067, filed on Sep. 26, 2012, now abandoned.

(51) Int. Cl.
| | | |
|---|---|---|
| B32B 37/20 | (2006.01) | |
| B32B 27/08 | (2006.01) | |
| B32B 27/30 | (2006.01) | |
| B32B 27/34 | (2006.01) | |
| B32B 27/36 | (2006.01) | |
| B32B 38/10 | (2006.01) | |

(52) U.S. Cl.
CPC ............ *B32B 37/20* (2013.01); *B32B 27/08* (2013.01); *B32B 27/30* (2013.01); *B32B 27/34* (2013.01); *B32B 27/36* (2013.01); *B32B 38/10* (2013.01); *B32B 2250/02* (2013.01); *B32B 2250/24* (2013.01); *Y10T 156/1705* (2015.01); *Y10T 428/269* (2015.01); *Y10T 428/31725* (2015.04); *Y10T 428/31786* (2015.04); *Y10T 428/31938* (2015.04)

(58) Field of Classification Search
CPC ........ B32B 37/20; B32B 27/34; B32B 38/10; B32B 27/30; B32B 27/36; B32B 27/08; Y10T 428/269; Y10T 156/1705
USPC ................. 83/23, 100, 302, 54, 870, 879, 13, 83/425–436.2; 156/510, 259; 242/419.8
See application file for complete search history.

(56) References Cited

U.S. PATENT DOCUMENTS

| | | | | |
|---|---|---|---|---|
| 2,986,079 A | * | 5/1961 | Triolo ..................... | B31B 37/00 493/217 |
| 3,003,911 A | * | 10/1961 | Lindstrom ............. | A01C 21/00 156/184 |
| 3,600,479 A | * | 8/1971 | Yazawa et al. ........ | B29C 55/065 264/146 |
| 3,713,931 A | * | 1/1973 | Lerche-Svendsen .... | D04H 5/02 156/148 |
| 3,728,980 A | * | 4/1973 | Fraze .................... | B21D 51/383 72/325 |
| 3,730,821 A | * | 5/1973 | Jackson ................. | B29D 28/00 156/197 |
| 3,790,744 A | * | 2/1974 | Bowen ............... | B23K 26/0033 156/250 |
| 3,799,824 A | * | 3/1974 | Arnao et al. ........... | B29D 29/10 156/139 |

(Continued)

FOREIGN PATENT DOCUMENTS

| | | |
|---|---|---|
| JP | 01-150658 A | 6/1989 |
| JP | 2002-363514 A | 12/2002 |

*Primary Examiner* — Sean Michalski
(74) *Attorney, Agent, or Firm* — IP&L Solutions; Edward K Welch, II

(57) ABSTRACT

Improved methods and apparatus are provided for the production of prepreg slit tape wherein master rolls of prepreg sheet are formed which are capable of being slit, with liner attached, at high precision.

20 Claims, 3 Drawing Sheets

(56) References Cited

U.S. PATENT DOCUMENTS

| | | | | |
|---|---|---|---|---|
| 3,803,959 | A * | 4/1974 | Rung | B26D 1/035 242/525.5 |
| 3,831,828 | A * | 8/1974 | Royon | B65H 23/02 226/16 |
| 3,871,253 | A * | 3/1975 | Pryce | B26D 1/035 83/102 |
| 3,875,837 | A * | 4/1975 | Dussaud | A41B 13/04 604/358 |
| 4,294,145 | A * | 10/1981 | Bodewein | B65H 23/26 83/279 |
| 4,775,583 | A | 10/1988 | Kawamura | |
| 5,380,576 | A * | 1/1995 | Christensen | D04H 1/42 428/109 |
| 6,129,964 | A * | 10/2000 | Seth | C09J 7/0296 24/306 |
| 6,286,403 | B1 * | 9/2001 | Rosenthal | B26D 1/205 83/152 |
| 7,182,008 | B2 * | 2/2007 | Negishi | B26D 1/0006 83/15 |
| 7,754,322 | B2 * | 7/2010 | Tilbrook | C08G 59/38 428/297.4 |
| 7,770,837 | B1 * | 8/2010 | Head | B65H 18/28 242/160.1 |
| 8,206,540 | B2 | 6/2012 | Evans | |
| 2005/0087306 | A1 * | 4/2005 | Mikkelsen | B08B 7/0028 156/767 |
| 2007/0044900 | A1 | 3/2007 | Tingley | |
| 2008/0044940 | A1 * | 2/2008 | Watanabe | B32B 37/20 438/64 |
| 2008/0135174 | A1 | 6/2008 | Kisch et al. | |
| 2008/0166511 | A1 * | 7/2008 | Honma | C08G 59/50 428/36.4 |
| 2010/0084084 | A1 * | 4/2010 | Miller, II | B32B 38/04 156/249 |
| 2010/0092770 | A1 * | 4/2010 | Wadahara | B29C 43/003 428/339 |
| 2010/0282404 | A1 | 11/2010 | Ellis | |
| 2012/0015135 | A1 | 1/2012 | Beraud et al. | |
| 2012/0061018 | A1 * | 3/2012 | Miller, II | B32B 38/04 156/260 |
| 2012/0100362 | A1 | 4/2012 | Ellis et al. | |
| 2013/0122277 | A1 | 5/2013 | Ellis et al. | |
| 2014/0083267 | A1 * | 3/2014 | Silva | B26D 1/22 83/39 |
| 2014/0217332 | A1 * | 8/2014 | Simmons | B32B 5/022 252/511 |
| 2015/0147544 | A1 * | 5/2015 | Minsky | B32B 27/10 428/215 |
| 2015/0173964 | A1 * | 6/2015 | Coe | A61F 13/51394 156/73.1 |

* cited by examiner

PREPREG TAPE SLITTING METHOD AND APPARATUS

RELATED APPLICATION

The present application is a continuation application of allowed U.S. patent application Ser. No. 13/627,067, filed Sep. 26, 2012.

FIELD OF THE INVENTION

The present application is directed to a method of and apparatus for preparing improved master rolls of prepreg sheet materials for slitting, the improved master rolls so formed, and a simplified slitting apparatus for slitting the improved master rolls. Specifically, the present application is directed to a method of and apparatus for preparing improved master rolls of prepreg sheet material wherein the improvement lies in the application of a liner material which is suitable for and remains affixed to the prepreg material during slitting without compromising the slitting process or the slit tape formed. In following, the present application is also directed to an improved method of greatly simplified apparatus for slitting prepreg sheet materials which method allows for the slitting of the prepreg sheet material without having to remove the backing before passing the prepreg materials through the slitter.

BACKGROUND

Advances in composite technology have had a marked impact on product design and engineering and, ultimately, manufacture. Early methods involving hand lay-up of fibrous materials and sheets with the subsequent impregnation of the laid up materials and, subsequently, the laying up of pre-impregnated fibrous sheets and mats followed by compression forming and curing saw rapid adoption and exploitation of these composite materials and technologies in many fields. However, while useful for many applications, the slow methodical build-up of the layers of materials is very labor intensive, oftentimes involves the use of hazardous chemicals and, more importantly, employs unstable materials and/or materials having limited working time. Thus, while a marked advance in the industry, their applications were still limited and costly.

Subsequent advances in composite materials and technology led to continuous manufacturing techniques. Perhaps the most notable of these techniques is filament winding wherein a continuous tow of certain fibrous materials were pulled though a bath of a curable material to impregnate the same with the curable material, the wet tow is then wound about a mandrel to form the desired part, preferably with some measure of immediate cure (oftentimes a UV cure) to attain a green state so as to prevent excessive flow of the resin material and maintain the fiber placement during the winding process following which the wound structure is fully cured. However, these operations are very slow and time consuming owing, in large part, to the narrow width of the tow. More importantly, these processes are very capital intensive as the whole of the operation, from preparation of the curable composition to the wetting of the tow of fiber material and, subsequently, to the formation of the part itself, all had to be performed in the same immediate vicinity of one another, typically on the same floor space.

Continued advances in both manufacturing and materials technology led to the ability to prepare cut sheets and, subsequently, master rolls of "green state" or partially cured prepreg materials: the latter in the form of continuous strips and sheets of tows of woven fibers or unidirectional, parallel fibers, most typically glass or carbon fibers, impregnated with a thermoset/thermosetting resin, especially epoxy, BMI or Polyimide resins. These prepreg materials are generally formed on a support sheet material, typically paper, which also serves as a separator or liner material to prevent successive layers, in the case of stacked cut sheets, or successive windings, in the case of master rolls, of the prepreg materials from contacting and adhering or melding to one another. The so formed cut sheets and master rolls of prepreg materials are then stored and shipped to the ultimate end-user for use in manufacturing composite structures. Owing to the unstable nature of the thermoset/thermosetting resin material, these cut sheets and master rolls are stored and maintained at significantly reduced temperatures, oftentimes at or below freezing, until use or further processing so as to prevent or at least significantly retard premature curing of the thermoset resin. The inherent cost advantages and focus on centered expertise (e.g., prepreg manufacturers concentrated on the chemistry and manufacture of the prepreg materials and the product manufacturers concentrated on the layup process) proved beneficial all around. No longer was it necessary for the ultimate composite product manufacturer to invest in the capital equipment, consumable materials, overhead, spatial requirements, and technical expertise and personnel to make the prepreg materials.

Advances have also been made whereby the prepreg materials may be formed using a thermoplastic resin, rather than a thermoset/thermosetting resin. Here the thermoplastic polymer is heated to a soften, flowable or at least readily pliable state and combined with and infiltrated through the fibers. This may be accomplished by many known methods including extrusion/co-extrusion, pultrusion, vacuum/pressure molding, injection molding, etc., to form the prepreg materials, also known as composite materials. These prepreg materials are mated with a liner as they are being formed or subsequent thereto but prior to stacking or rolling.

Early on, master rolls of prepreg strip or sheet materials were manufactured in standard widths that were then used to make the commercial products. This was acceptable as many applications had very similar demands and requirements, e.g., baseball bats, golf clubs, hockey sticks, lacrosse sticks and the like can all be made with generally the same width of slit tape, largely because the demands are similar and the need for differentiation less. Even if not optimal, these stock rolls were used nonetheless as making many different widths, especially making custom widths, was cost prohibitive: the capital requirements are quite large and incapable of supporting a large differentiation of product widths. Consequently, the full adoption of this technology in higher demanding and higher tech applications was limited if the width of the tapes needed were inconsistent with the widths that were available.

More recently, the technology has evolved and new expertise and processing capabilities have been developed whereby a broad array of tape widths are made possible through the slitting of stock master rolls. Specifically, slitting apparatus and equipment has been developed which allows one to unwind the master rolls of prepreg material, remove the liner, pass the prepreg material through a slitter whose cutting elements, e.g., knives or blades, are spaced to produce the desired widths of tape, and rewind the so formed prepreg slit tape, commonly referred to as just "slit tape," with a new liner, preferably a polymer liner. This innovation allowed for the production of wide slit tape for use in the manufacture of large planar or curved planar surfaces as well as narrow width slit tape for use in the manufacture of more intricate parts and/or parts having multiple changes in surface orientation.

Although the advent of slit tape allowed for the use of prepreg materials in the manufacture of many different products whose demands, especially physical demands, required specific properties which are affected by, in part, the width of the prepreg slit tape, limitations still existed. Specifically, the extension of the use of slit tape into high tech applications, especially in the production of components for aerospace and aircraft production, has placed increased demands on consistency and tight tolerances in the slit tape, both in terms of the make-up and dimensions of the slit tapes. While one might think that the demands for aerospace and aircraft production would be fairly constant, nothing could be further from reality. Each component for aerospace and aircraft production must endure a combination of environment conditions and physical demands and stresses that are most often unique to that component. For example the requirements of the tail fin of an aircraft will be markedly different from those of a wing or a fuselage portion. Similarly, the shapes of such components vary from generally smooth, curved structures, as with a fuselage, to multi-oriented surfaces with sharp angles, as with a tail fin.

In order to meet the requirements for aircraft and aerospace applications, it has become more and more apparent that a plethora of widths of slit tape are needed with differences in the width of the slit tape from one application to the another oftentimes being on the order of just fractions of an inch. Furthermore, and perhaps more importantly, these applications demand extremely tight tolerances in relation to any variation in the width of the slit tape for a given application, with tolerances being orders of magnitude smaller than for most commercial applications. In aerospace, it is not uncommon for tolerances in width to be on the order of thousandths, if not ten-thousandths, of an inch.

However, the requirements do not end there as slit tape for these and other high tech applications must also be free of artifacts, whether of foreign origin or which original from the master prepreg materials themselves. The former can be controlled by proper environmental controls and clean-room type practices. The latter, however, requires care in the selection and implementation of materials, apparatus and methods or processes. For example, poor quality cutting elements, e.g., knives or blades, and/or improper or too infrequent cleaning thereof may lead to a buildup of resin on the blade which, in turn, may attach to or fall on the slit tape as it moves out of the slitter. While such artifacts are generally not problematic in the winding of the slit tape, the concern here is that such artifacts may create or lead to a potential failure point in the part to the made.

As noted above, slit tape is typically formed by unwinding the master roll of prepreg material, removing the backing (which also acts as a liner for the master roll), passing the prepreg material through a slitter whose cutting elements, e.g., knives are spaced to produce the desired widths of slit tape, and rewinding the so formed slit tape with a new liner. Removing the backing from the master roll prior to the slitting operation is critical in order to meet the tight tolerances and artifact free requirement for high tech applications, especially aerospace and aircraft production.

The most common backing material used in the production of master rolls is paper. Because paper is comprised of fibrous materials whose orientation is random, it is difficult, if not impossible, to avoid the formation or accumulation of fibrils along the cut edge of the paper as well as the generation of free fibrils and paper dust which become airborne. These loose fibrils and the paper dust then adhere to and comprise undesired artifacts on the slit tape itself. The degree to which such fibrils and paper dust form is, in part, dependent upon the quality and condition of the slitting knives or blades themselves, with more being formed as the knives or blades become worn. Of course, it is to be appreciated that the coarse nature of the paper would also hasten the wearing of the knife of blade.

In addition to an increase in the generation of fibrils and paper dust, poor quality and/or worn knives and blades leads to or increases the rate of the buildup of fibrils and/or resin on the blade, which affects the consistency of the cut as well as, again, the deposit of artifacts on the slit tape. Furthermore, when paper is moving across a stationary knife or blade, especially one that is worn, there is the tendency for the paper to catch on the knife or blade. This happenstance may lead to a tear in the paper and/or, more critically, an unexpected jolt, snag, or stall in the slitting process, which, in turn, causes a movement in the prepreg and slit tape as it is being formed and, hence, a variation in the width of the slit tape and/or a tear or break in the slit tape itself.

Although paper as the backing still dominates, one or two manufacturers have recently experimented with and produced prepregs using a polymer backing, a polymer film or fabric, owing to their cost-effectiveness. However, like paper, there are no set requirements as to the integrity, nature, orientation, or physical properties of these polymer backings or their peel strength relative to the prepreg material as their sole purpose is merely to serve as the foundation in the manufacture of the prepreg material and, subsequently, the separator between successive windings thereof in forming the master rolls. However, while cost effective, polymer backings have some similar problems as well as unique problems associated with their use. For example, unlike paper, which lies flat and has a consistent tautness across its surface, polymer backings, owing to their more supple nature, tend not to lie flat and may and/or fail to lie with a consistent stress or tautness across their surface. Furthermore, unlike paper whose porosity allows for the escape of air trapped between the prepreg material and the paper, polymer films provide no path of escape and, consequently, air pockets form that are then wound into the subsequently formed master rolls.

Each of the foregoing factors affects the integrity of the interface between the prepreg material and the polymer backing. For example, folds in or bunching up of the polymer backing and/or the presence of air pockets trapped between the prepreg material and the backing create areas where there is no direct contact or adherence between the prepreg and the backing. In master rolls, this is not an issue, but in forming slit tape it would be devastating. Specifically, were one to try to slit these materials without removing the backing, the lack of adherence between the backing and prepreg material allows for relative motion or movement of one to the other during the slitting process which adversely affects the final dimensions of the slit material. Depending upon the extent of the bunching of the polymer backing and/or the size of the area lacking contact, this could also lead to a jam in the slitter, necessitating one to shut down the process to rectify the situation. A jam also raises the risk for compromising the slit tape structurally and dimensionally, including those slit tape tows that would otherwise have been in specification. Furthermore, assuming that the problem area passed through the slitter without problem, without a bond between the prepreg material and the backing, there is the likelihood, if not certainty, of misalignment between the two as the slit tape is being wound. Consequently, the opportunity exists for prepreg on prepreg in such windings whereby the successive layers in contact with each other bond or meld together making the roll unsuitable for subsequent manufacturing applications. Hence, it is critical to remove the polymer backing to slitting as well.

Equally critical to the typical prepreg slitting operation is the need to insert a new liner, a polymer liner or, more commonly, a polyliner, as the slit tape is being wound so as to prevent bonding or melding of one layer of slit tape to another. This interlining or interleafing process, as it is commonly referred, requires great precision both in terms of alignment and tension of the liner and slit tape as one must directly align the narrow strip of slit tape with the liner as well as ensure good mating between the two so that the two do not move relative to one another in the final winding step. In part, this is addressed by employing a liner material that is somewhat wider than the slit tape. However, even that has its limitations as one can only economically and functionally use a liner whose width is marginally wider than the slit tape, perhaps 10 to 20 percent, in the case of narrow tapes, somewhat less in the case of wide tapes. Though the additional width is quite small, over the miles and miles of slit tape produced the added materials costs begin to add up.

Additionally, the use of wider liner material affects the consistency or evenness of the winding, particularly in helical windings, as ridges and valleys form reflecting those areas of the winding where slit tape is and is not present. Similarly, in spool windings, it is difficult to directly align the slit tape over itself as the outer edges of the liner orient the winding as it occurs. Lastly, since most specifications for slit tape are weight and/or size limited, the excess liner affects the amount of prepreg slit tape that can be wound on any given spool or spindle.

The second key factor in addressing alignment concerns and the integrity of the contact between the slit tape and liner is the liner feed and alignment system itself. Owing to the speed of these systems as well as the narrow widths of slit tape being produced, liner feed and alignment systems require a large degree of sophistication in order to properly align the liner with the slit tape and to do so under a constant tension to ensure good liner to slit tape contact across the whole of the width of the slit tape. Yet, suitable liner feed and alignment systems entail significant capital expense: an expense that is only multiplied as each winding station must have its own liner feed and alignment capability. Thus, if one has 64 winding heads, one needs 64 liner feed and associated alignment systems.

Thus, despite all the advances that have been made, there still remains a need in the industry for a simpler, less capital intensive and less costly process and apparatus for producing of slit tapes.

More importantly, there still remains a need in the industry for such a process and apparatus that can be implemented without a significant capital investment and without compromising or sacrificing production rate and quality.

SUMMARY

According to the present teachings there is provided a simplified, less capital intensive, and less costly method for the production of slit tape which method does not require the removal of the backing material from the master roll of prepreg sheet material as it is being fed into the slitter. Specifically, there is provided a method for the production of slit tape which method involves unwinding the master roll of prepreg sheet material with liner attached, passing the same through the slitter, thereby simultaneously slitting the prepreg sheet and liner, and winding the so formed slit tape, with liner attached. This process is further characterized as employing a master roll of prepreg sheet whose liner is a polymer film having certain predefined physical properties and attributes which a) enable its slitting without tearing, without the formation of fibrils, and without separating from the prepreg material; b) enables its winding without elongation or the creation of stress fractures in the film; and c) manifests a constant or substantially constant peel strength with the prepreg material.

According to a second aspect of the present teaching there is provided a simplified and less capital intensive apparatus for the conversion of prepreg master roll to slit tape which apparatus is either free of master roll backing removal and winding apparatus or has, in addition thereto, a polymer film liner supply and alignment apparatus for replacing the backing with a polymer film liner. The apparatus is also free of liner feed and alignment apparatus associated with its slit tape winding heads.

According to a third aspect of the present teachings there is provided a method for the production of master rolls suitable for use in the above-referenced method which method involves replacing the liner or backing material used in the formation of the prepreg sheet material with a polymer film having certain predefined physical properties and attributes which a) enable its slitting without tearing, without the formation of fibrils, and without separating from the prepreg material; b) enables its winding without elongation or the creation of stress fractures in the film; and c) manifests a constant or substantially constant peel strength with the prepreg material. The replacement may be performed in-line during the preparation of the prepreg sheet material prior to winding on the master roll or it may performed after winding of the master roll but prior to slitting. In the former, the replacement is performed by the prepreg manufacturer whereas the latter may be performed by the prepreg manufacturer or anyone else prior to slitting.

According to a fourth aspect of the present teaching there is provided an apparatus for the in-line replacement of the liner or backing material used in the formation of the prepreg sheet with the aforementioned polymer film prior to winding of the master roll.

According to a fifth aspect of the present teaching there is provided an apparatus for the conversion of conventional master rolls to master rolls wherein the backing is removed and replaced with a polymer film liner before the prepreg is rewound into an improved master roll.

According to a sixth aspect of the present teaching there is provided a prepreg slitting apparatus wherein the backing is removed as the prepreg is unwound from the master roll and replaced with a polymer film liner before the prepreg is advanced to the slitter.

Finally, according to a seventh aspect of the teaching of the present application there is provided novel master rolls of prepreg sheet material which are characterized as being capable of being slit with the liner attached while maintaining product integrity and tolerances. Specifically, there are provided master rolls wherein successive windings of the prepreg sheet material are separated by a polymer film which, when slit in combination with the prepreg material, is capable of being slit without tearing, without the formation of fibrils, and without separating from the prepreg material; which allows for its winding without elongation or the creation of stress fractures in the film; and which manifests a constant or substantially constant peel strength with the prepreg material.

These and other aspects, details and benefits of the present teachings will be more fully described in and apparent from the specification below.

BRIEF DESCRIPTION OF THE DRAWINGS

The accompanying drawings which form a part of the specification are to be read in conjunction therewith. Like reference numerals are employed to indicate like parts in the various views.

DETAILED DESCRIPTION

Figure 1:
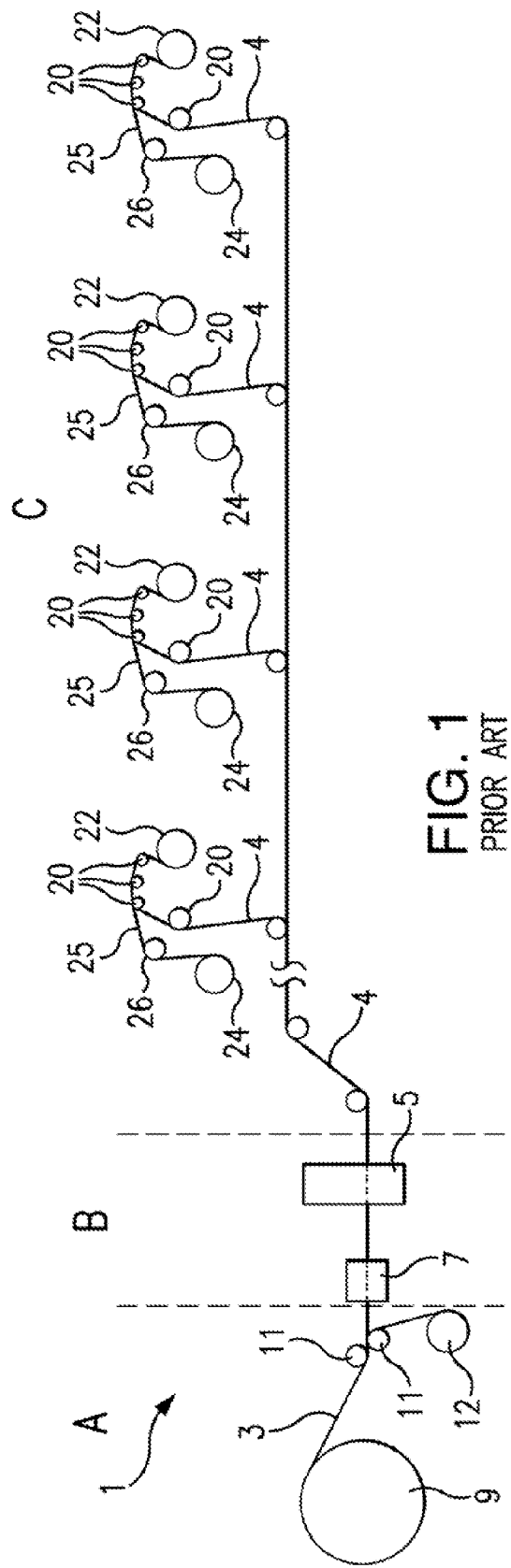
FIG. 1 is a schematic side view of a conventional, slitting and winding apparatus.

As used herein and in the appended claims, the term "continuous" when used in reference to the prepreg sheet material and slit tape refers to long lengths of such materials whereby these materials are wound for storage and/or transportation. Typically, continuous prepreg sheets and tapes will have lengths of from at least about 10 meters, more typically 25 meters, up to about 1000 meters or more and widths of from about 0.1 meters to 2.5 meters, preferably from about 0.7 meters to about 1.5 meters. Additionally, although specific reference herein is made to prepreg sheet materials of unidirectional carbon fibers impregnated with curable epoxy resins, it is understood that the present teachings are not so limited. Indeed, the present teachings are equally applicable to other prepreg sheet materials, including those made of glass fibers, polymer fibers, and combinations of fibers, as well as those wherein the matrix resin is any of number of curable or thermosetting matrix resins including, but not limited to epoxies, cyanate esters, bismaleimides, phenolics, polyimides, and the like or a thermoplastic resin such as polyethylene, polypropylene, polyamide, polyphenylene sulfide, polyetherimide, polyetheretherketone, polyetherketoneketone, and the like, or combinations of thermoset resins, thermoplastic resins or both.

While few details are provided herein with respect to the elements of the apparatus as well as the apparatus as a whole, other than the revisions made herein, such details and information are well known to those skilled in the art and available commercially: thus, a lengthy detailed disclosure is not necessary. For example, suitable slitters typically comprise one or more cutting elements in combination with rollers and/or alignment means wherein the cutting elements are of the type known to be suitable for the cutting of prepreg materials for high tech applications. Similarly, little if anything is said in relation to the elements and components of the apparatus responsible for advancing the materials from one roll to another or for winding or unwinding the materials. In this regard, it is to be appreciated that the apparatus as described herein includes a plurality of motor driven axels or hubs upon which the various rolls, spindles, spools, etc., mentioned herein are mounted, thereby aiding the unwinding and winding of the various materials. In addition to the foregoing, the system may integrate motorized pinch rollers for further assisting in the draw and/or advancing of the various tape materials. Those, skilled in the art, having the benefit of the present disclosure and appended drawings will readily appreciate the placement and types of motor driven axels and hubs necessary.

According to the present teachings there is provided:
- a method for the production slit tape which method does not require the removal of the backing or liner material from the master roll of prepreg sheet material as it is being fed into the slitter for forming the slit tape or the interleafing of a liner material as the slit tape is being wound;
- a method for the production slit tape which method includes the removal of the backing material and replacement thereof with a polymer film liner prior to slitting and eliminates the need to interleaf a new liner material as the slit tape is being wound
- apparatus for performing the aforementioned slitting processes;
- a method for the production of master rolls of prepreg sheet materials for use in the aforementioned slitting process;
- an apparatus for producing the aforementioned master rolls in-line during the production of the prepreg sheet materials;
- a method of converting conventional master rolls of prepreg sheet material to master rolls suitable for use in the aforementioned slitting process;
- an apparatus for converting conventional master rolls to master rolls suitable for use in the aforementioned slitting process; and
- master rolls of prepreg sheet material suitable for use in the aforementioned slitting process.

Each of these teachings is premised upon the production and use of master rolls of prepreg sheet material which are characterized as being capable of being slit with the liner attached without adversely affecting product integrity, production tolerances, and process efficiency: indeed, if anything, the these attributes and others are improved.

The key element necessary to effectuate and tying together these teachings is the selection and use of certain polymer films as liner materials in the production or conversion of the master rolls to be employed in the slitting process.

Specifically, the present teachings require the use of a polymer film as the liner material wherein the polymer film:
- Is composed of a material that is compatible for use with the matrix resin of the prepreg material and, most preferably, will not chemically react with one another. For example, the polymer film (a) will not accelerate or promote cure of the curable matrix resin or, conversely, prevent or retard cure in the case of a thermoset/thermosetting matrix resin; (b) degrade or otherwise adversely affect the properties of the polymer in the case of the thermoplastic matrix resin and/or (c) will not be adversely affected by the matrix resin;
- Manifests sufficient adhesive or peel strength when in contact with the prepreg material to withstand the stresses of the winding, slitting and rewinding operations without separating from the prepreg sheet during the winding and slitting thereof or from the slit tape, even at narrow widths, during the winding thereof, but is readily and cleanly removed from the slit tape without compromising the dimensions thereof and, preferably, without leaving remnants of the film on the surface of the slit tape;
- Has a flexibility sufficient to accommodate the winding about a spool or spindle without creating stresses or weakness in the liner which may affect the dimensions and/or strength of the liner or, more critically, the slit tape to which it is mated; and Has a sufficiently high yield strength whereby the liner will not deform even under high stresses encountered in the slitting and rewinding process and preferably, even under higher stresses as may be encountered if, for example, the slit tape winders continue to wind though prepreg is not progressing though the slitters.

Preferably the polymer film:

has a thickness of up from about 0.1 to about 12 mils, preferably 0.5 to about 5 mils, more preferably from about 1 to about 2.5 mils;

has a 100-950% elongation whereby once yield strength is reached, it will elastically and plastically deform and elongate to prevent or delay a break in the liner and, coincidently the slit tape; and/or a surface energy on one side that is different from the surface energy on the other such that the film preferentially and more strongly bonds to the slit tape to which is it first mated rather than the underlying slit tape upon which it is wound.

has a coefficient of friction of 0.1 to 0.9 such that the polymer film spools and the slit tape/polymer liner spools will keep stable format and shape.

Has a machine direction tensile strength of 500 psi to ~40000 psi and a traverse direction tensile strength of 500 psi to 30000 psi such that the liner will not deform even under high stresses encountered in the slitting and rewinding process Has an arithmetic average surface roughness of 0.01 um to 150 um, preferably from 0.1 um to 100 um, to provide sufficient adhesive or peel strength when in contact with the prepreg material and to sufficient release when slit tape spools are unwound during later manufacturing process.

The foregoing is intended to provide the basic parameters from which those skilled in the art will be able to identify and select appropriate polymer films for use in the practice of the present teachings. In this regard, it is to be appreciated that a variety of factors and conditions will affect the selection of the polymer film including the chemistry and cure characteristics of the matrix resin; the chemistry and physical parameters of the polymer film; the tack of the matrix resin, especially under the slitting conditions; the speed and line tensions in the slitting and winding process; etc. For example, while a film of low surface energy may be best for use with a prepreg that has a high degree of tack, a film of high surface energy would be preferred with a prepreg material with a low degree of tack, at least under the conditions at which the film and slit tape are mated. Similarly, polymer films typically have residual catalyst, stabilizers, plasticizers and the like in their composition, each of which may interact with components of the matrix resin of the prepreg. Thus, it is important to select films that do not have constituents or residual constituents that may impact the cure characteristics of the matrix resin. Conversely, care must also be taken to ensure that the components of the matrix resin do not adversely affect the physical properties and attributes of the polymer film. For example, it is important that the components of the matrix resin do not render brittle, weaken, or cause crazing in the film.

As noted, and evident from the foregoing, it is not possible to define each of the desired, if not required, characteristics of the polymer film in a quantitative manner since, clearly, selection depends upon a host of considerations and factors, not the least of which is the make-up of the prepreg materials being wound and slit. Nonetheless, despite the general description of the polymer film, it is believed that those skilled in the art, having the benefit of the present teachings, will readily appreciate and identify suitable polymer films for use with a given matrix resin and slitting conditions or will be readily able to ascertain the same by simple trial and error.

Notwithstanding the foregoing, it is to be appreciated that suitable polymer films include those made of polyolefins, polyamides, polyesters, vinyl polymers, polyacetates and the like: though again, not all, including not all within a given family of polymers, may be suitable for any given matrix resin. Exemplary polymer films suitable for use in the practice of the present teachings include those made of polyethylene (PE), including low density polyethylene, high density polyethylene, and linear low density polyethylene; polypropylene, biaxially oriented polypropylene, polyethylene-propylene copolymer, polytetrafluroethylene, polyvinyl acetate, polyvinyl chloride, polyvinyl alcohol, ethylene vinylacetate (EVA), EVA-PE blends, polystyrene, biaxially oriented polystyrene, polyethylene terephthalate, polyamide 6, polyamide 6,6, cellulose triacetate, just to name a few. Most preferably, the polymer film is a polyolefin, especially polyethylene.

Turning back to the initial focus of the present teachings, there is provide a method for the production of slit tape from continuous prepreg sheet materials wherein the method comprises passing the pre-preg sheet material with liner attached through the slitter element so as to concurrently slit the prepreg tape and liner. This contrasts with conventional prepreg slitting processes which involve the removal of the backing or liner as the prepreg material is being fed to the slitter and the subsequent interleafing of a new liner material as the slit tape is being wound. This and other distinctions between conventional processes and apparatus and those according to the present teachings are better explained in conjunction with reference to FIGS. 1 and 2.

Figure 2:
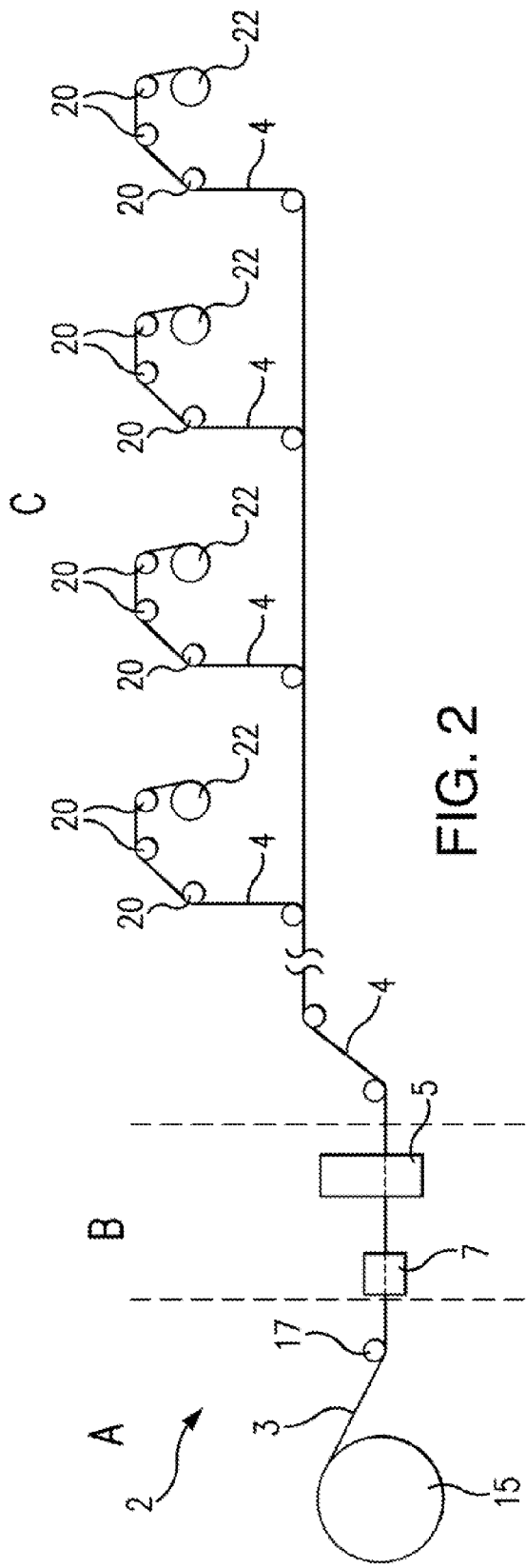
FIG. 2 is a schematic side view of a simplified slitting and winding apparatus used in the practice of the present teachings.

FIG. 1 depicts a schematic side view of a traditional slitting apparatus whereas FIG. 2 depicts a simplified and less costly apparatus according to the present teachings. Each apparatus, 1 in FIGS. 1 and 2 in FIG. 2, comprises three distinct sections, a front end section (A) in which the master roll is located, a mid-section (B) where the prepreg sheet is slit, and an end section (C) where the slit tape is wound.

The mid-section (B) is the same in both figures and comprises a slitter 5 which slits the prepreg sheet 3 into the desired number of slit tapes 4 of pre-determined width(s). Optionally, though preferably, and as shown in FIGS. 1 and 2, the mid-section also comprises a splicer 7 for splicing the trailing end of one master roll to the forward end of a second master roll. Spicing allows for the production of rolls, pancakes or spools of slit tape of specific lengths regardless of the length of the prepreg sheet on the master roll. Splicing also allows for the insertion of a blank material, e.g., a liner material, so as to "prime" the apparatus for subsequent use after a given slitting operation is completed. Specifically, when the run of slitting is completed, the master roll is removed. If prepreg sheet material remains on the master roll it is cut at a point prior to the splicer. A roll of liner replaces the master roll of prepreg sheet and the liner unwound and the forward end thereof spliced to the tail end of the prepreg sheet. The slitting process is resumed and as the remaining prepreg sheet is pulled through the apparatus, it likewise pulls the liner. Once the slit tape is fully wound, the liner is cut at the winder and the apparatus shut down. To reinitiate the apparatus, one merely has to cut the liner at the roll, remove the roll of liner and splice the cut end of the liner to the fore end of the prepreg sheet of a new master roll, and then resume slitting.

The first difference between the prior art slitting apparatus 1 and the apparatus according to the present teaching 2 is noted in the front end section A. The prior art apparatus of FIG. 1 comprises a master roll of prepreg sheet 9, a plurality of placement and alignment rollers 11 for properly aligning the prepreg sheet 3 for advancement to the mid-section B. Two such rollers are shown in FIG. 1, though a single roller or more rollers could also be employed. At the second roller the backing is peeled from the prepreg sheet and wound on a backing winding spool 12. In this manner, only the prepreg sheet passes through to the mid-section and the slitting operation.

In contrast, as evident from FIG. 2, the front end section of the slitting apparatus comprises a master roll 15, though in this case the master roll has a liner of a polymer film which has replaced the original backing in accordance with the teachings herein. Here, the prepreg sheet is unwound from the master roll and is advanced directly to the mid-section and the slitting operation. Preferably, and as shown in FIG. 2, there is one or more placement and alignment rollers 17 which help align the advancing prepreg with the slitter. Here, there is no need for excess rollers nor, more importantly, a winder and winding spool for the backing material as the liner material in this embodiment remains adhered to the prepreg material throughout the process.

Other differences lie in the end section (C) which comprises a plurality of winding stations for the slit tape, four as shown in the figures. In FIGS. 1 and 2, the winding stations of each comprise a plurality of placement and alignment rollers 20 and a winder 22 where the slit tape is wound about a spool, spindle or like core element. The prior art winding stations of FIG. 1, further comprise a feed or supply 24 of liner tape 25 and a plurality of placement and alignment rollers 20/26 for aligning the liner with the slit tape prior to their being wound at the winder. These elements are not necessary nor present in the apparatus of FIG. 2.

Furthermore, while both apparatus employ a plurality of placement and alignment rollers in the end section, the prior art apparatus employ more as one must align both the liner and the slit tape. More importantly, the prior art apparatus require rollers of higher precision as they must properly align and overlay the liner on the slit tape as they are mated and before they are wound on the winder. Finally, though not shown, the conventional apparatus of FIG. 1 also require a plurality of tensioning devices, controllers, sensors, and the like for maintaining a proper tension in the liner material as it is mated with the slit tape. The failure to maintain a proper tension results in or certainly increases the likelihood of misalignment of the liner and slit tape which can lead to direct contact and adherence or melding between successive layers of the slit tape as it is wound.

All of these additional elements and operations of the conventional apparatus and process add considerable operating costs and capital expense to slitting process: costs and expenses that are accentuated by the fact that each winding station or head must have its own liner feed and associated elements. Accordingly, the apparatus of the present teachings provides a much simpler and less costly apparatus while providing the same, if not a better, slit tape product in a more cost effective manner.

As noted, a key aspect to realizing the benefit of the present teachings is the production of master rolls of prepreg materials wherein the liner is a polymer film liner that is firmly adhered to the prepreg sheet material across its full width and along its full length and manifests the properties and characteristics as set forth above. Traditional master rolls are not suitable for many reasons, as noted in the background section. Rather, one must either manufacture master rolls according to the present teaching or convert traditional master rolls to those in accordance with the present teaching. The former requires the in-line i) removal of the backing used in the manufacture of the prepreg sheet materials once the prepreg material has set sufficiently to allow such processing without altering the dimensions or consistency thereof and ii) the replacement thereof with a polymer film liner according to the teachings above. The latter involves a roll to roll unwinding and winding of the prepreg sheet with the removal of the backing and the insertion of the polymer film liner occurring between the two rolls.

Figure 3A:
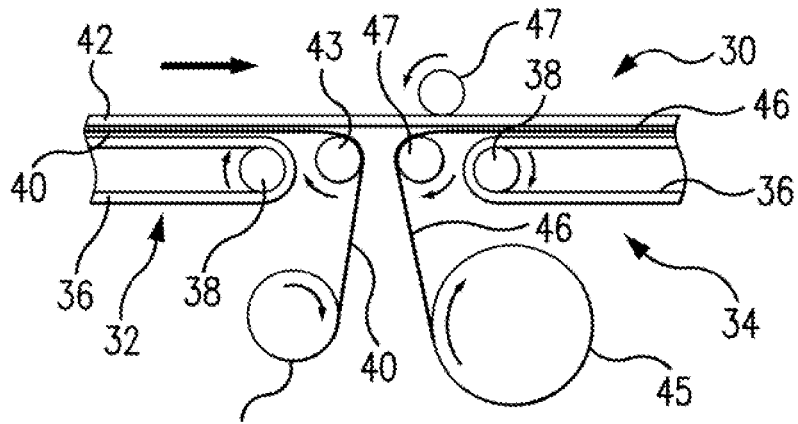
FIGS. 3A, 3B and 3C are schematic side views of a portion of a prepreg sheet manufacturing apparatus incorporating, at various points, the capability for the in-line replacement of the backing with a polymer film liner according to the present teachings.
Figure 3B:
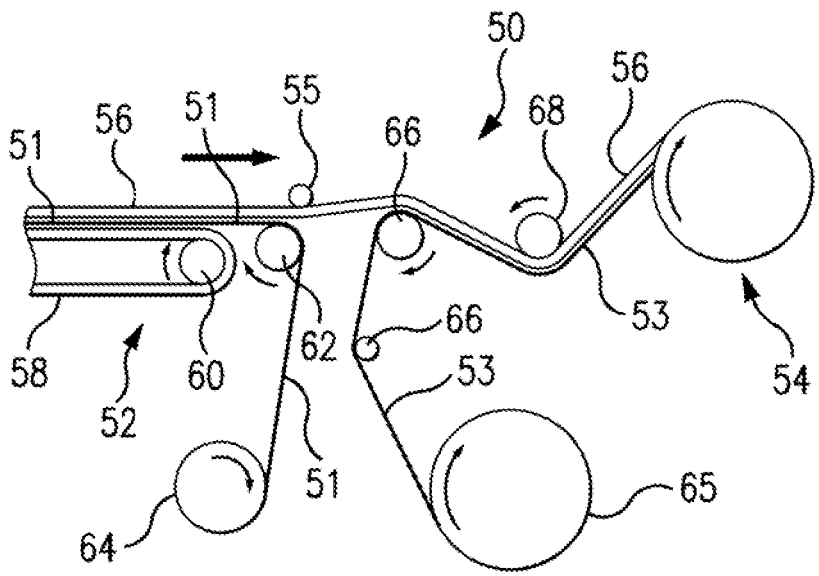
Figure 3C:
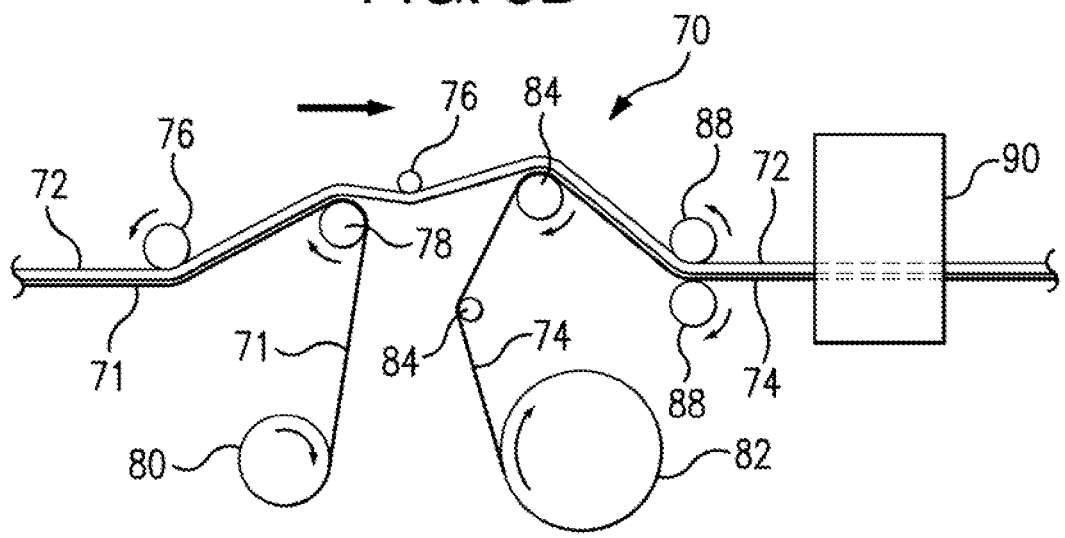

FIGS. 3A, 3B and 3C depict three of the many possible options by which a conventional apparatus for the production of continuous prepreg sheet materials may be altered or redesigned to make it capable of producing continuous prepreg sheet material for use in the practice of the present teachings. A conventional prepreg manufacturing apparatus typically comprises a frame having a moving, continuous platform, typically a conveyor belt or like apparatus, upon which is fed and laid a continuous sheet of a backing material, typically paper. The platform will typically have sidewalls so as to form a shallow trough the length of the platform in which the backing lay. The apparatus further comprises components for supplying to and laying upon the moving backing a feed of continuous fibers, in an aligned parallel relationship, and a thermosetting matrix resin, typically in a molten or liquid state. Once applied to the backing, the resin and fibers are pressed together, often by one or more rollers and/or squeegee-like elements that bridge the width of the platform from one side wall to the other. Depending upon the nature of the thermosetting resin, the moving platform may carry the mass through one or more curing stations where the mass is subjected to conditions that partially cure or render the mass in a green state, without fully curing or cross-linking the matrix resin. Alternatively, or in addition, the matrix resin may simply set by cooling in which case the platform may continue until sufficient cooling has been attained or past cooling elements that enhance cooling. Once the so formed continuous prepreg sheet material has hardened sufficiently so as to show minimal signs of flow or creep and to allow winding without altering the thickness of the sheet, e.g., without causing the resin matrix to flow and be squeezed out of the winding as it is being wound, the prepreg sheet, with backing attached, is wound on a master spindle or core element and stored under low temperatures for subsequent use.

FIG. 3A depicts a portion of a continuous prepreg sheet forming apparatus wherein a subapparatus 30 for removing the backing and replacing it with a polymer film liner is incorporated into the moving platform at a point along the length of the moving platform where the matrix resin is sufficiently solidified so as to maintain its shape and integrity while removing the backing and in the absence of the backing. Specifically, as seen in FIG. 3A, the tail end of one moving platform 32 is adjacent, but spaced from, the fore end of a second, successive moving platform 34. In this figure, the moving platform comprises a plurality of conveyor belts 36 continuously rotating about their respective axels 38. The gap between the ends of the two conveyor belts serves as the operative region where the backing 40 on the prepreg sheet material 42 is removed or peeled from the prepreg at roller element 43 and wound upon a backing take-up winder 44. Concurrently, a continuous polymer film liner 46 is unwound from a supply spool 45 and aligned with and mated with the prepreg sheet material 42 by a plurality of positioning and alignment rollers 47. One or more of these rollers may also be positioned, configured or constructed to press the liner to the prepreg sheet material as it passes over or between the rollers. In this embodiment, the newly lined prepreg sheet material continues on for full setting to its green state or winding state for subsequent operation, which could be winding or slitting.

FIG. 3B depicts an embodiment wherein a subapparatus 50 for removing the backing 51 and replacing it with a polymer film liner 53 is incorporated into the moving platform at the tail end of the moving platform 52, intermediate the moving platform and the master roll winder 54 for winding the prepreg sheet 56. It is also to be appreciated that while FIG. 3B shows the moving platform 52 in close proximity to the master roll winder 54, such is not necessary. The winder may be placed some distance from the moving platform provided that there are appropriate positioning and alignment rollers in place to support the prepreg sheet between the moving platform and the subapparatus, or if the latter is closer to the moving platform, between the subapparatus and the winder.

In FIG. 3B the moving platform comprises a conveyor belt 58 continuously rotating about its respective axels 60. As the prepreg sheet travels past the end of the conveyor belt it engages a roller element 62 which facilitates the removal and peeling of the backing 51 from the prepreg sheet 56, which backing is then taken up by backing take-up winder 64. One or more positioning and alignment rollers 55 may also be present to ensure continued alignment of the prepreg sheet as it continues to move forward through the subapparatus. Concurrently, a continuous polymer film liner 53 is unwound from a supply spool 65 and aligned with and mated with the prepreg sheet material 56 by a plurality of positioning and alignment rollers 66. One or more of these rollers 68 may also be positioned, configured or constructed to press the liner to the prepreg sheet material as it passes over or between the rollers. Finally, the prepreg sheet with the polymer film liner is then wound about a spool, spindle or core element on master roll winder 54. Once completed, the master roll is then removed and placed in cold storage to cool.

FIG. 3C depicts an embodiment wherein a subapparatus 70 for removing the backing 71 and replacing it with a polymer film liner 74 is incorporated into the apparatus associated with the continuous manufacture and slitting of prepreg tape. In this particular figure, the subapparatus is positioned after the end of the moving platform, at a point where the prepreg sheet and liner are self-supporting and do not require the presence to the platform. Instead, a plurality of positioning and alignment rollers 76 position and carry the prepreg sheet to and through the subapparatus 70. Still, it is to be appreciated that the subapparatus could be incorporated at the tail end of the moving platform, as indicated in FIG. 3B.

As the prepreg sheet advances into the subapparatus, it engages positioning and alignment roller 78 which also facilitates the removal and peeling of the backing 71 from the prepreg sheet 72, which backing is then taken up by backing take-up winder 80. Concurrently, a continuous polymer film liner 74 is unwound from a supply spool 82 and aligned with and mated with the prepreg sheet material 72 by a plurality of positioning and alignment rollers 84. One or more of these rollers 88 may also be positioned, configured or constructed to press the liner to the prepreg sheet material as it passes over or between the rollers. From there, the prepreg sheet advanced directly into the slitter 90 for slitting and on to the appropriate winding apparatus for winding the so formed slit tape. In this embodiment, it is preferred that the mated polymer film liner and prepreg sheet material are pressed together, especially by press rollers to ensure sufficient adherence or tack between the two. This is not as critical a factor in the embodiment where the prepreg sheet material is wound in a master roll as the winding and weight of the master roll itself ensures a proper bond.

It is also to be appreciated that the subapparatus of FIG. 3C could also be incorporated into a slitting apparatus between the master roll and the slitter. In this manner, the removal of the backing and insertion of the polymer film liner occurs in-line in the slitting apparatus and method.

In accordance with another embodiment of the present teachings, there is provided a process and apparatus for converting conventional master rolls to master rolls suitable for use the practice of the aforementioned slitting process wherein the liner and prepreg materials are slit concurrently. Although the foregoing embodiments provide apparatus for the direct production of such suitable master rolls as well as subapparatus that may be retrofitted into existing prepreg sheet manufacturing and/or slitting apparatus, such entails added capital expense and may not be possible given processing and spacing limitations, at least not without substantial realignment and reconfiguration of equipment and apparatus.

Figure 4:
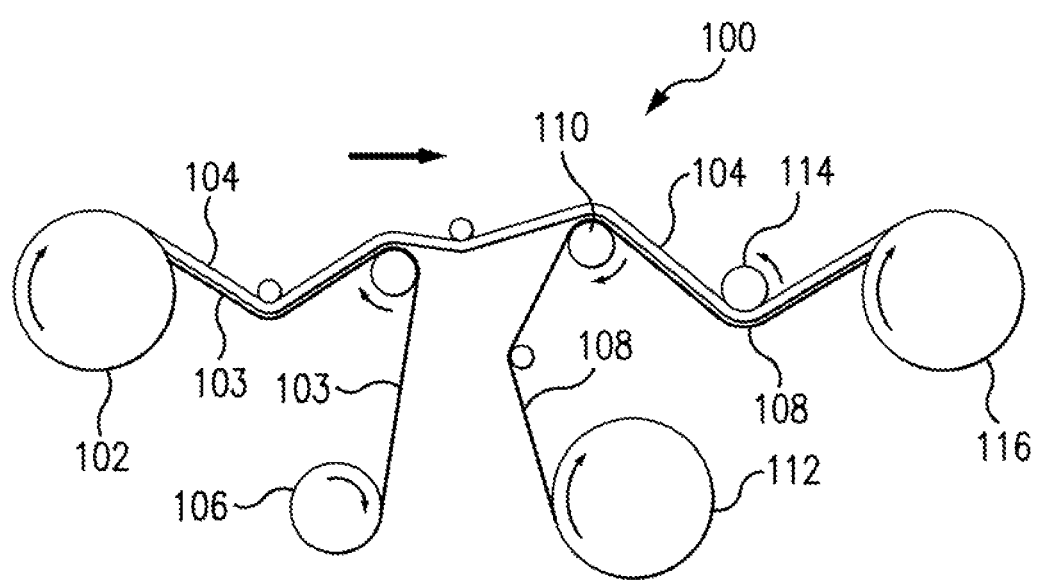
FIG. 4 is a schematic side view of a converting apparatus for converting a conventional master roll into the improved master rolls suitable for use in the practice of the present teaching.

Accordingly, as shown in FIG. 4, there is provided an apparatus 100 for converting conventional master rolls of prepreg sheet to those having a polymer film liner as required for used in the practice of the presently taught slitting process. This apparatus comprises four distinct stations. The first is that station wherein a master roll 102 of prepreg sheet 104 with the backing 103 intact is unwound and fed into the second station where the backing is removed and wound about backing take-up winder 106. The prepreg sheet 104 continues to the third station where a polymer film liner 108 and the prepreg sheet are aligned and mated. In FIG. 4, this point is shown by roller 110. The polymer film liner is supplied from stock roll of polymer film 112. The mated polymer film liner and prepreg sheet then pass over and through one or more additional positioning and alignment rollers 114, which may or may not apply pressure to the mated liner and prepreg sheet material to enhance bonding. The mated liner and prepreg sheet is then advanced to a winding station where it is wound into a master roll 116. The so formed master roll is then ready for use in the practice of the herein taught slitting process.

In each of the processes for the production of the master rolls described above, it is to be appreciated that the width of the polymer liner material may be the same as, but, is preferably slightly wider than the width of the prepreg sheet to which it is being mated. Though grooved rollers, especially double grooved rollers, will assist in ensuring proper alignment of the liner to prepreg sheet, the additional width of the polymer film adds further insurance that the matrix resin of one layer in the winding will not mate with or bond with the matrix of the underlying or overlaying layer of the winding. Furthermore, since the edges of the master rolls upon slitting are typically discarded, any excess liner is likewise discarded and the slit tape produced form these master rolls will have clean edges with the tape and liner directly overlaying one another.

The improved master rolls, prepreg manufacturing and slitting processes and apparatus of the present teachings have many additional benefits and attributes over conventional processes and apparatus beyond those of the lower capital costs and simpler apparatus and processes as described above. Indeed, improvements have been realized in both processing and product using various polymer films, especially polyethylene, most especially high density polyethylene, on various prepreg sheet materials. Specifically, slitting the prepreg sheet with the polymer film liner attached has led to an improvement in slit width variance, reducing slit width variation by up to 40% or more. It is thought that the polyliner adds structural integrity to the prepreg sheet as it passes through the slitter counteracting the still "fluid" nature of the matrix resin. Additionally, the practice of the present teachings has led to reduced cycle times due to less buildup of resin in the slitter, especially on the knives or blades. Such improvements approach, if not exceed, 25% with epoxy-based, carbon fiber prepregs. Additionally, improvements in cycle time performance of 100% and more have been seen in the case of bismaleimide (BMI) and polyimide based prepregs: materials that have heretofore been very difficult to slit. In this respect, it is thought that the polymer film liner cleans the knives or blades or functioned as a barrier preventing what build up does occur from contacting the slit tape as it passes by. Depending upon the make-up of the film, it may also include additives which coat the blades or knives which prevent the build-up of resin. Production efficiency and throughput is further enhanced, upwards of 33% or more, by the reduction in liner misalignment and, consequently, a reduction in line stoppage to address the misalignment.

In addition to process efficiency improvements, the product is less costly due to the significant reduction in liner costs. Conventional slitting operations require one to manufacture of slit liners to be somewhat sized to the slit tape to be produced. Thus, one incurs the expense of slitting the liner whereas the present process allows for the use of stock master rolls of liner. Additionally, as previously noted, the conventional process requires the use of liner strips that are wider than the slit tape: a happenstance that consumes considerably larger amounts of liner material. Furthermore, the absence of excess liner on each slit tape, particularly given the weight and size limitations on the rolls to be supplied to the end-users, enables for the production of rolls of slit tape having more slit tape, hence the need for fewer change overs of the spools or spindles in the winding process as well as by the end-user. This, in turn, leads to further increases and enhancement in the overall productivity of the slitting process as well as the manufacturing process using the slit tape.

Although the method and apparatus of the present specification have been described with respect to specific embodiments and figures, it should be appreciated that the present teachings are not limited thereto and other embodiments utilizing the concepts expressed herein are intended and contemplated without departing from the scope of the present teaching. Thus true scope of the present teachings is defined by the claimed elements and any and all modifications, variations, or equivalents that fall within the spirit and scope of the underlying principles set forth herein.

We claim:

1. A method of preparing a continuous sheet of prepreg material suitable for use in a slitting process for the production of slit tape which slitting process does not require the removal of a liner or backing prior to slitting nor the insertion of a liner prior to winding the slit tape so formed, the method comprising:
    a) unwinding a master roll of a continuous sheet of prepreg material having a paper or polymer film backing attached,
    b) removing the backing from the prepreg material,
    c) aligning and mating a polymer film liner with the prepreg material, and
    d) rewinding the mated prepreg material and polymer film liner to form a new master roll;
    wherein the liner is a polymer film which is 1) able to be slit by the slitter without tearing, without the formation of fibrils, and without separating from the prepreg material; 2) resists elongation and/or the creation of stress fractures in the film under the stress of winding, and 3) manifests a sufficient adhesive or peel strength with the prepreg material so as avoid separating from the prepreg material under the stresses of the unwinding, slitting and winding processes.

2. The method of claim 1 wherein the liner is composed of a material that is compatible with the matrix resin of the prepreg material.

3. The method of claim 1 wherein the liner is composed of a material that has a thickness of 0.1 to about 12 mils, a lengthwise tensile strength of 500 psi to 40,000 psi, and an arithmetic average surface roughness of 0.01 to 200 um.

4. The method of claim 1 wherein the polymer film liner is composed of a polyolefin, a polyamide, a polyester, a vinyl polymer, or a polyacetate.

5. The method of claim 1 wherein the polymer film liner is polyethylene.

6. A master roll of a continuous sheet of prepreg material, said master roll having been formed by a method comprising:
    a) unwinding a master roll of a continuous sheet of prepreg material having a paper or polymer film backing attached,
    b) removing the backing from the prepreg material,
    c) aligning and mating a polymer film liner with the prepreg material, and
    d) rewinding the mated prepreg material and polymer film liner to form a new master roll;
    wherein the liner is a polymer film which is 1) able to be slit by the slitter without tearing, without the formation of fibrils, and without separating from the prepreg material; 2) resists elongation and/or the creation of stress fractures in the film under the stress of winding, and 3) manifests a sufficient adhesive or peel strength with the prepreg material so as avoid separating from the prepreg material under the stresses of the unwinding, slitting and winding processes.

7. The master roll of claim 6 wherein the liner is composed of a material that is compatible with the matrix resin of the prepreg material.

8. The master roll of claim 6 wherein the liner is composed of a material that has a thickness of 0.1 to about 12 mils, a lengthwise tensile strength of 500 psi to 40,000 psi, and an arithmetic average surface roughness of 0.01 to 200 um.

9. The master roll of claim 6 wherein the polymer film liner is composed of a polyolefin, a polyamide, a polyester, a vinyl polymer, or a polyacetate.

10. The master roll of claim 6 wherein the polymer film liner is polyethylene.

11. An apparatus for the conversion of master rolls of continuous sheets of prepreg materials having a paper or polymer film backing to a master roll of a prepreg material having a liner whereby the prepreg material may be slit with liner attached, said apparatus comprising a master roll station for holding and unwinding the original master roll, a separator station wherein the backing of the original master roll is removed from the prepreg sheet material, a lining station wherein the prepreg material is aligned with an mated to a polymer film liner, and a winding station wherein the prepreg and liner are wound into a new master roll.

12. The apparatus of claim 11 wherein the master roll station comprises an axel, which may be motorized, upon which the master roll of prepreg material is to be mounted; the separator station comprises a motorized axel upon which a spindle is to be mounted for taking up and winding the backing as it is removed from the prepreg sheet material; the lining station comprises an axel, which may be motorized, upon which a roll of liner material is to be placed, and alignment mean for aligning and mating the liner material with the prepreg material; and the winding station comprises a motorized axel upon which a spindle is to be mounted about which the prepreg and liner combination is to be wound.

13. The apparatus of claim 12 further comprising a roll of a polymer film placed on the axel of the lining station wherein the polymer film is 1) able to be slit by the slitter without tearing, without the formation of fibrils, and without separating from the prepreg material; 2) resists elongation and/or the creation of stress fractures in the film under the stress of winding, and 3) manifests a sufficient adhesive or peel strength with the prepreg material to be slit so as avoid separating from the prepreg material under the stresses of the unwinding, slitting and winding processes.

14. The apparatus of claim 13 wherein the liner is composed of a material that has a thickness of 0.1 to about 12 mils, a lengthwise tensile strength of 500 psi to 40,000 psi, and an arithmetic average surface roughness of 0.01 to 200 um.

15. The apparatus of claim 13 wherein the polymer film liner is composed of a polyolefin, a polyamide, a polyester, a vinyl polymer, or a polyacetate.

16. The apparatus of claim 13 wherein the polymer film liner is polyethylene.

17. An improved process for the production of master rolls of continuous sheets of prepreg material adapted wherein the improvement comprises using a polymer film liner material as the backing in the preparation of the prepreg sheet wherein the liner is 1) able to be slit by the slitter without tearing, without the formation of fibrils, and without separating from the prepreg material; 2) resists elongation and/or the creation of stress fractures in the film under the stress of winding, and c) manifests a sufficient adhesive or peel strength with the prepreg material so as avoid separating from the prepreg material under the stresses of the unwinding, slitting and winding processes.

18. The improved process of claim 17 wherein the liner is composed of a material that is compatible with the matrix resin of the prepreg material.

19. The improved process of claim 17 wherein the liner is composed of a material that has a thickness of 0.1 to about 12 mils, a lengthwise tensile strength of 500 psi to 40,000 psi, and an arithmetic average surface roughness of 0.01 to 200 um.

20. The improved process of claim 17 wherein the polymer film liner is composed of a polyolefin, a polyamide, a polyester, a vinyl polymer, or a polyacetate.

* * * * *